US012617103B2

(12) United States Patent
Nikovski et al.

(10) Patent No.: US 12,617,103 B2
(45) Date of Patent: May 5, 2026

(54) SYSTEMS AND METHODS FOR TASK-SPECIFIC ADAPTIVE VELOCITY ESTIMATION IN AUTOMATED CONTROL AND MONITORING SYSTEMS

(71) Applicant: Mitsubishi Electric Research Laboratories, Inc., Cambridge, MA (US)

(72) Inventors: Daniel N. Nikovski, Brookline, MA (US); William S. Yerazunis, Acton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 171 days.

(21) Appl. No.: 18/433,522

(22) Filed: Feb. 6, 2024

(65) Prior Publication Data

US 2025/0249600 A1     Aug. 7, 2025

(51) Int. Cl.
*B25J 13/08*         (2006.01)
*B25J 9/16*          (2006.01)
(Continued)

(52) U.S. Cl.
CPC ............. B25J 13/088 (2013.01); B25J 9/163 (2013.01); G01B 21/22 (2013.01); G01P 3/00 (2013.01)

(58) Field of Classification Search
CPC ......... B25J 13/088; B25J 9/163; G01B 21/22; G01P 3/00; G01P 3/50; G05B 13/024; G05B 19/401
(Continued)

(56) References Cited

U.S. PATENT DOCUMENTS 5,434,489 A *    7/1995   Cheng ................ G05B 19/4182
                                                      318/568.15
11,648,666 B2 *  5/2023   Kielsholm ............. B25J 9/1635
                                                      700/253
(Continued)

OTHER PUBLICATIONS

M. Noack, J. Reger and J. Jouffroy, "Adaptive Velocity Estimation for Lagrangian Systems using Modulating Functions," 2023 IEEE International Conference on Mechatronics (ICM), Loughborough, United Kingdom, 2023, pp. 1-8, doi: 10.1109/ICM54990.2023. 10101935 (Year: 2023).*
(Continued)

*Primary Examiner* — Jaime Figueroa
(74) *Attorney, Agent, or Firm* — Gene Vinokur

(57)          ABSTRACT

A method for adapting a causal FIR filter is provided. The causal FIR filter is configured to estimate velocities by filtering position measurement data in accordance with a frequency response of an electro-mechanical system involved in a task. The method uses a processor coupled with stored instructions to implement the method. The stored instructions, when executed by the processor, carry out steps of the method. The method includes collecting a sequence of position measurement data and a corresponding sequence of ground truth velocities of a component of the electro-mechanical system performing the task. The method further includes adapting the causal FIR filter for estimating velocities of the component performing the task by updating one or more coefficients of the causal FIR filter to reduce a difference between the sequence of ground truth velocities and estimated velocities produced by filtering the sequence of position measurement data by the causal FIR filter.

18 Claims, 13 Drawing Sheets

(51) Int. Cl.
  | | |
  |---|---|
  | *G01B 21/22* | (2006.01) |
  | *G01P 3/00* | (2006.01) |
  | *G05B 13/02* | (2006.01) |

(58) Field of Classification Search
  USPC ................. 700/245–264; 318/568.11–568.25
  See application file for complete search history.

(56) References Cited

U.S. PATENT DOCUMENTS

| | | | | |
|---|---|---|---|---|
| 2014/0039681 A1* | 2/2014 | Bowling | ................ | A61B 34/30 |
| | | | | 700/261 |
| 2014/0067124 A1* | 3/2014 | Williamson | ......... | G05B 19/406 |
| | | | | 700/258 |
| 2014/0222207 A1* | 8/2014 | Bowling | ................ | A61B 17/16 |
| | | | | 700/261 |
| 2021/0094174 A1* | 4/2021 | Romeres | .................. | G06N 7/01 |
| 2023/0165647 A1* | 6/2023 | Dozeman | ............... | A61B 34/30 |
| | | | | 700/254 |

OTHER PUBLICATIONS

P. Besset et al., "FIR filter-based online jerk-controlled trajectory generation," 2016 IEEE International Conference on Industrial Technology (ICIT), Taipei, Taiwan, 2016, pp. 84-89, doi: 10.1109/ICIT.2016.7474730. (Year: 2016).*

Pierre Besset, Richard Bearee. FIR filter-based online jerk-constrained trajectory generation. Control Engineering Practice, 2017, 66, pp. 169-180. 10.1016/j.conengprac.2017.06.015. hal-01575057 (Year: 2017).*

Javier Moreno-Valenzuela; Velocity field control of robot manipulators by using only position measurements; 2007 Elsevier; Journal of the Franklin Institute 344 (2007) 1021-1038; doi:10.1016/j.jfranklin.2007.05.006 (Year: 2007).*

S. B. Liu, A. Giusti and M. Althoff, "Velocity Estimation of Robot Manipulators: An Experimental Comparison," in IEEE Open Journal of Control Systems, vol. 2, pp. 1-11, 2023, doi: 10.1109/OJCSYS.2022.3222753. (Year: 2022).*

R. H. Brown, S. C. Schneider, and M. G. Mulligan, "Analysis of algorithms for velocity estimation from discrete position versus time data," IEEE Transactions on industrial electronics, vol. 39, No. 1, pp. 11-19, 1992.

R. J. E. Merry, M. J. G. Van de Molengraft, and M. Steinbuch, "Velocity and acceleration estimation for optical incremental encoders," Mechatronics, vol. 20, No. 1, pp. 20-26, 2010.

A. Cortiella, K.-C. Park, and A. Doostan, "A priori denoising strategies for sparse identification of nonlinear dynamical systems: A comparative study," Journal of Computing and Information Science in Engineering, vol. 23, No. 1, p. 011004, 2023.

* cited by examiner

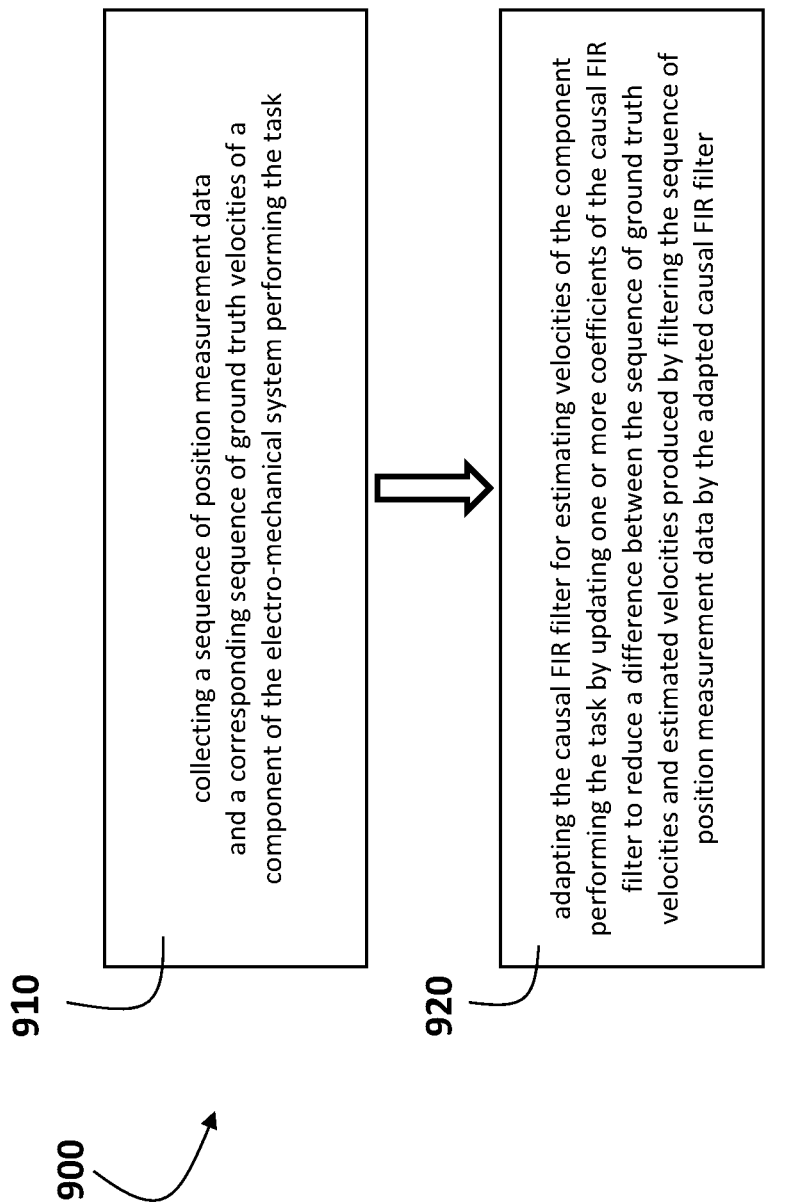

900

910 collecting a sequence of position measurement data and a corresponding sequence of ground truth velocities of a component of the electro-mechanical system performing the task

920 adapting the causal FIR filter for estimating velocities of the component performing the task by updating one or more coefficients of the causal FIR filter to reduce a difference between the sequence of ground truth velocities and estimated velocities produced by filtering the sequence of position measurement data by the adapted causal FIR filter

FIG. 11

SYSTEMS AND METHODS FOR TASK-SPECIFIC ADAPTIVE VELOCITY ESTIMATION IN AUTOMATED CONTROL AND MONITORING SYSTEMS

FIELD OF THE DISCLOSURE

The present disclosure relates generally to velocity estimation, and more specifically to systems and methods for task-specific adaptive velocity estimation in automated control and monitoring systems.

BACKGROUND

Velocity estimation plays an important role in the control and monitoring of many mechanical systems whose state is described by both position variables (angles or distances) as well as velocities (angular or linear). More often than not, dedicated velocity sensors (such as tachometers) are not available, and velocities need to be estimated from position sensors, most commonly rotary encoders. Encoders introduce quantization noise, i.e., errors or discrepancies that arise due to the discrete nature of the position information provided, which depends on the resolution of the encoder. This noise, when incorporated into the determined velocity signal, may end up creating a disturbance in the control signal that can significantly worsen the performance of the controller and even render it unstable.

In the context of mechanical systems, stability and accuracy in velocity estimation are essential for effective control and monitoring. Addressing the issues related to quantization noise from encoders is therefore desirable for improving the overall performance of the system.

SUMMARY

The present disclosure provides systems and methods for task-specific adaptive velocity estimation in automated control and monitoring systems of electro-mechanical systems. Generally, a causal finite impulse response (FIR) filter is used to estimate velocities of one or more components of an electro-mechanical system (such as a robot) based on position measurement data. The causal FIR filter is task-specific, as optimal coefficients of the causal FIR filter may vary by task. The task may be defined by a desired-set point or a motion trajectory of the components and/or by properties of a load moved by the components. While the task is being executed, a position sensor (such as an encoder) collects a sequence of position measurement data defining the movement of the component. The sequence of position measurement data is then processed by the causal FIR filter to determine a sequence of estimated velocities. In some examples, the electro-mechanical systems may include multiple causal FIR filters with different coefficients corresponding to different components of the system.

In order to produce accurate estimated velocities, the coefficients of the causal FIR filter are adapted by comparing the estimated velocities to a sequence of ground truth velocities corresponding to both the performed task and the electro-mechanical system being monitored. The coefficients are updated to reduce a difference between the estimated velocities and the ground truth velocities, thereby creating a more accurate causal FIR filter to estimate velocities. In some examples, the ground truth velocities may be captured using a tachometer. These captured ground truth velocities may then be used to train the coefficients of the causal FIR filter. In other examples, the ground truth velocities may be determined by processing the position measurement data with an acausal filter. The acausal filter may be trained offline with measured position and velocity data.

Some embodiments of the present disclosure are based on recognizing the advantages and disadvantages of using causal filters for estimating the velocity of the operation of the electro-mechanical components from sequential measurements of the position of these electro-mechanical components. As an advantage, the causal filters are fast, computationally efficient, and can be implemented on inexpensive embedded systems with limited computational capabilities. As a disadvantage, the causal filters that consider only previously measured position data inevitably introduce noise and time lags in their estimations. It is an object of some embodiments to attenuate the disadvantages of the causal filters configured to estimate velocities from a sequence of position data while preserving their advantages.

Some embodiments are based on recognizing that causal filters, such as causal finite impulse response (FIR) filters, are designed based on various principles agnostic to the specifics of the task of the operation performed by the electromechanical components. Examples of such task-agnostic filter design include first-order backward difference estimator (BDE), Taylor series expansion (TSE), and the like. The chosen design method affects the characteristics of the filter.

Considering the variety of possible uses of causal filters and the specifics of their designs and their operations, deployment of such a task-agnostic filter design should not come as a surprise. However, some embodiments of the present disclosure are based on recognizing, informed by mathematical analysis and simulations, that differently designed causal filters can work better for different tasks. In other words, the design of a causal filter should be based on the requirements of the task the filter is designed to measure. Specifically, in the context of the filter design for estimating velocities by filtering position data of an electro-mechanical component performing a task, the causal filter should be designed in consideration of the frequency response of a task defining the frequency range within which the measured velocities are going to lie.

To that end, it is an object of some embodiments of the present disclosure to provide a system and a method for adapting a causal FIR filter. The causal FIR filter is configured to estimate velocities by filtering position data according to a frequency response of a task. As used herein, adapting a filter means tuning, updating, and/or determining one or more of its parameters, such as values of filter coefficients defining its impulse response, as well as filter order, delay, and sampling rate.

Some embodiments of the present disclosure are based on recognizing that such an adaptation can be performed using a model of the system and/or a model of a task. However, in many practical applications, these models are not available. To that end, it is an object of some embodiments to provide a data-driven method for adapting a filter to the task.

To that end, various embodiments of the present disclosure adapt a causal filter based on the data indicative of the specifics of the task. For example, some embodiments (1) collect a sequence of position data and a corresponding sequence of ground truth velocities of an electro-mechanical component performing a task and (2) adapt the causal FIR for estimating velocities of the electro-mechanical component performing the task by updating parameters of the causal FIR filter to reduce a difference between the sequence of ground truth velocities and velocity estimates produced by filtering the sequence of position data by the adapted causal FIR filter.

Generally, in one example, a method for adapting a causal FIR filter is provided. The causal FIR filter is configured to estimate velocities by filtering position measurement data in accordance with a frequency response of an electro-mechanical system involved in a task. The method uses a processor coupled with stored instructions implementing the method. The stored instructions, when executed by the processor, carry out steps of the method.

The method comprises collecting a sequence of position measurement data and a corresponding sequence of ground truth velocities of a component of the electro-mechanical system performing the task.

The method further comprises adapting the causal FIR filter for estimating velocities of the component performing the task by updating one or more coefficients of the causal FIR filter to reduce a difference between the sequence of ground truth velocities and estimated velocities produced by filtering the sequence of position measurement data by the adapted causal FIR filter.

According to an example, the method further includes determining the sequence of ground truth velocities corresponding to the sequence of position measurement data by: (1) processing the sequence of position measurement data with an acausal filter to generate a sequence of ground truth positions; and (2) acausal central differencing the sequence of ground truth positions to obtain the sequence of ground truth velocities. The acausal filter may be a Savitzky-Golay symmetric acausal filter.

According to an example, the method further includes determining the sequence of ground truth velocities corresponding to the sequence of position measurement data based on a sequence of ground truth positions, wherein the sequence of ground truth positions are determined by: solving an optimization problem to minimize a sum of a mean squared fitting error between the sequence of ground truth positions and the sequence of position measurement data. The optimization problem is subject to box constraints determined by a quantization scheme of an encoder capturing the sequence of position measurement data and a term expressing a curvature of the sequence of ground truth positions. The sequence of ground truth velocities are obtained by acausal central differencing the sequence of ground truth positions.

According to an example, the ground truth velocities are measured via a tachometer.

According to an example, the processor is configured to adapt the causal FIR filter for each of a plurality of tasks performed by the component of the electro-mechanical system. The plurality of tasks are different from each other when at least one of a motion trajectory of the component or a load moved by the component are different between the plurality of tasks.

According to an example, the method further includes (1) receiving, via the electro-mechanical system, a second task to be performed by the component; (2) collecting a second sequence of position measurement data and a second sequence of corresponding ground truth velocities corresponding to the second task; and (3) updating the coefficients of the causal FIR filter to reduce a difference between the second sequence of corresponding ground truth velocities and the estimated velocities produced by filtering the second sequence of position data by the adapted causal FIR filter.

According to an example, the coefficients of the causal FIR filter are updated using one or a combination of a linear regression fitting, a neural network execution, a moving least squares estimation, a radial basis function smoothing, a locally weighted scatterplot smoothing (LOWESS), a smoothing spline learning, and a Tikhonov smoothing.

According to an example, the method further includes actuating the component of the electro-mechanical system according to a control command. The control command is derived at least partially based on the estimated velocities.

According to an example, the task corresponds to control of or estimation corresponding to the component of the electro-mechanical system.

According to an example, the electro-mechanical system includes multiple components including a first component and a second component. The processor is configured to determine a first causal FIR filter for estimating velocities of the first component and a second causal FIR filter for estimating velocities of the second component. The coefficients of the first causal FIR filter differ from coefficients of the second causal FIR filter.

According to an example, the electro-mechanical system includes a robot, wherein the multiple components include multiple joints of the robot.

According to an example, one of the multiple components of the electro-mechanical system includes a motor moving a load. The task of the one of the multiple components includes one or a combination of a type of the load and a type of motion trajectory for moving the load.

Generally, in another aspect, an electro-mechanical system is provided. The electro-mechanical system includes multiple joints including at least a first joint having a first mass and a second joint having a second mass.

The electro-mechanical system further includes multiple actuators configured to actuate the multiple joints including a first actuator configured to actuate the first joint and a second actuator configured to actuate the second joint.

The electro-mechanical system further includes multiple position sensors for measuring positions of the multiple joints including a first position sensor configured to measure positions of the first joint and a second position sensor configured to measure positions of the second joint.

The electro-mechanical system further includes multiple causal finite impulse response (FIR) filters configured to estimate velocities of the multiple joints including a first causal FIR filter configured to estimate velocities of the first joint by filtering the measured positions of the first joint and a second causal FIR filter configured to estimate velocities of the second joint by filtering measured positions of the second joint. Coefficients of the first causal FIR filter differ from coefficients of the second causal FIR filter. The first causal FIR filter and the second causal FIR filter correspond to a task performed by the first joint and the second joint, respectively.

The electro-mechanical system further includes a feedback controller configured to submit control commands to the multiple actuators, wherein the control commands are determined based on the measured positions and the estimated velocities of the multiple joints.

According to an example, the coefficients of the first causal FIR filter are learned from data such that outputs of the first causal FIR filter approximate a sequence of ground truth velocities of the first joint. The coefficients of the second causal FIR filter are learned from data such that outputs of the second causal FIR filter approximates a sequence of ground truth velocities of the second joint.

According to an example, the electro-mechanical system further includes a machine learning module configured to determine the coefficients of the first causal FIR filter and the coefficients of the second causal FIR filter.

According to an example, the machine learning module is configured to: (1) excite the electro-mechanical system to collect a sequence of measured positions of the first joint and a sequence of measured positions of the second joint; (2) submit the sequence of measured positions of the first joint and the sequence of measured positions of the second joint to an acausal filter configured to estimate velocities with apriori denoising to receive a corresponding sequence of ground truth velocities of the first joint and the sequence of ground truth velocities of the second joint; (3) determine the coefficients of the first causal FIR filter such that outputs of the first causal FIR filter approximate the sequence of ground truth velocities of the first joint; and (4) determine the coefficients of the second causal FIR filter such that outputs of the second causal FIR filter approximate the sequence of ground truth velocities of the second joint.

According to an example, wherein the task corresponds to moving a load. The electro-mechanical system further includes a machine learning module configured to determine one or a combination of the coefficients of the first causal FIR filter and the coefficients of the second causal FIR filter in response to a change of the task and/or the load.

According to an example, a first size of the first causal FIR filter differs from a second size of the second causal FIR filter.

According to an example, at least one of the multiple position sensors is an encoder.

According to an example, the task corresponds to control of or estimation corresponding to at least one of the multiple joints.

In various implementations, a processor or controller can be associated with one or more storage media (generically referred to herein as "memory," e.g., volatile and non-volatile computer memory such as ROM, RAM, PROM, EPROM, and EEPROM, floppy disks, compact disks, optical disks, magnetic tape, Flash, OTP-ROM, SSD, HDD, etc.). In some implementations, the storage media can be encoded with one or more programs that, when executed on one or more processors and/or controllers, perform at least some of the functions discussed herein. Various storage media can be fixed within a processor or controller or can be transportable, such that the one or more programs stored thereon can be loaded into a processor or controller so as to implement various aspects as discussed herein. The terms "program" or "computer program" are used herein in a generic sense to refer to any type of computer code (e.g., software or microcode) that can be employed to program one or more processors or controllers.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also can appear in any disclosure incorporated by reference should be accorded a meaning most consistent with the particular concepts disclosed herein.

Other features and advantages will be apparent from the description and the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

FIG. 11 is a flow chart of a method for adapting a causal finite impulse response filter, in accordance with an example.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

The present disclosure provides systems and methods for task-specific adaptive velocity estimation in automated control and monitoring systems of electro-mechanical systems. Generally, a causal finite impulse response (FIR) filter is used to estimate velocities of one or more components of an electro-mechanical system (such as a robot) based on position measurement data. The causal FIR filter is task-specific, as optimal coefficients of the causal FIR filter may vary by task. The task may be defined by a desired set-point or a motion trajectory of the components and/or by properties of a load moved by the components. While the task is being executed, a position sensor (such as an encoder) collects a sequence of position measurement data defining the movement of the component. The sequence of position measurement data is then processed by the causal FIR filter to determine a sequence of estimated velocities. In some examples, the electro-mechanical systems may include multiple causal FIR filters with different coefficients corresponding to different components of the system.

Figure 1:
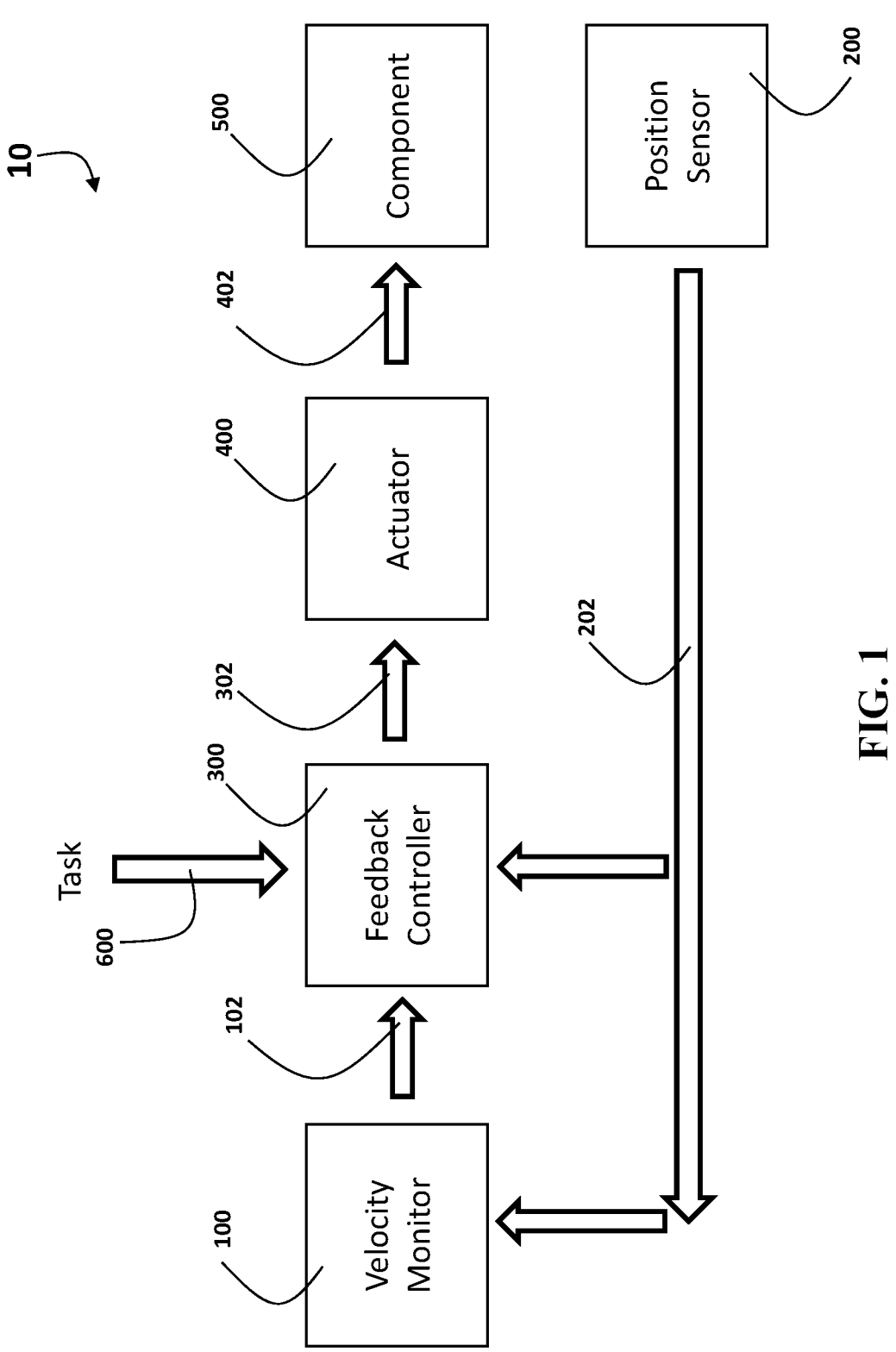
FIG. 1 illustrates a block diagram of an electro-mechanical system, according to some embodiments of the present disclosure.

Turning now to the figures, FIG. 1 illustrates a block diagram of aspects of an electro-mechanical system 10. Broadly, the non-limiting example of the electro-mechanical system 10 illustrated in FIG. 1 includes a velocity monitor 100, a position sensor 200, a feedback controller 300, an actuator 400, and a component 500, such as a joint, to be actuated. In this example, the feedback controller 300 receives a task 600. The task 600 could be provided to the electro-mechanical system 10 in a variety of ways. In some examples, the task 600 could be provided as a user input via a user interface. In other examples, the task 600 could be received via wired or wireless communication with an electronic device. In further examples, the task 600 could be stored in a memory of the electro-mechanical system 10. The task 600 could include a variety of actions to be implemented by the component, such as a motion trajectory or a moving of a load. In the case of moving a load, the task 600 may be defined in part by a weight of the load. The feedback controller 300 converts the received task 600 into a control command signal 302 for the current estimations of the positions and velocities of the component 500 of the system 10. The control command signal 302 is provided to an actuator 400. The actuator 400 is configured to actuate the component 500 via actuation force 402 in order to perform the task 600. For example, the actuator 400 may cause the component to rotate, linearly translate, or otherwise move in one or more directions. In some embodiments, the actuator 400 may be embodied as a motor. The component 500 may be defined according to a variety of properties, such as mass. In some examples, the component 500 may be a joint.

The position sensor 200 is configured to monitor the position of the component 500 being actuated by the actuator 400. The position sensor 200 generates position measurement data 202 while monitoring the component 500. The position measurement data 202 may be embodied as a sequence of linear coordinates or angular coordinates depending on the type of motion required by the task 600 In some examples, the position sensor 200 is an encoder, such as a rotary encoder. The resolution of the encoder introduces a degree of error into the position measurement data 202. In some examples, this error may be considered a quantization error based on the digital resolution of the encoder. Further, in some examples, the position sensor 200 may be embodied as more than one sensor, such as a sensor array.

The position measurement data 202 is provided to a velocity monitor 100. The velocity monitor 100 is shown in more detail in subsequent figures. The velocity monitor 100 may include or be coupled to a memory and a processor to store and process position measurement data 202 provided by the position sensor 200. The velocity monitor 100 is configured to generate a sequence of estimated velocities 102 based on the position measurement data 202 captured by the position sensor 200. These estimated velocities 102 are then provided to the feedback controller 300. The feedback controller 300 may then adjust the control command signal 302 according to the estimated velocities 102 and position measurement data 202 to regulate the motion of the actuation of the component 500, resulting in more accurate execution of the task 600. As previously noted, generating the estimated velocities 102 by simply taking a derivative of the position measurement data 202 may result in inaccuracies due to the error within the position measurement data 202. Accordingly, further processing by the velocity monitor 100 is required to generate accurate estimated velocities 102.

In some examples, the electro-mechanical system 10 may include multiple components 500 to be actuated. The actuation of the multiple components 500 may be implemented and controlled via multiple velocity monitors 100, multiple actuation controllers 300, and multiple actuators 400.

Figure 2:
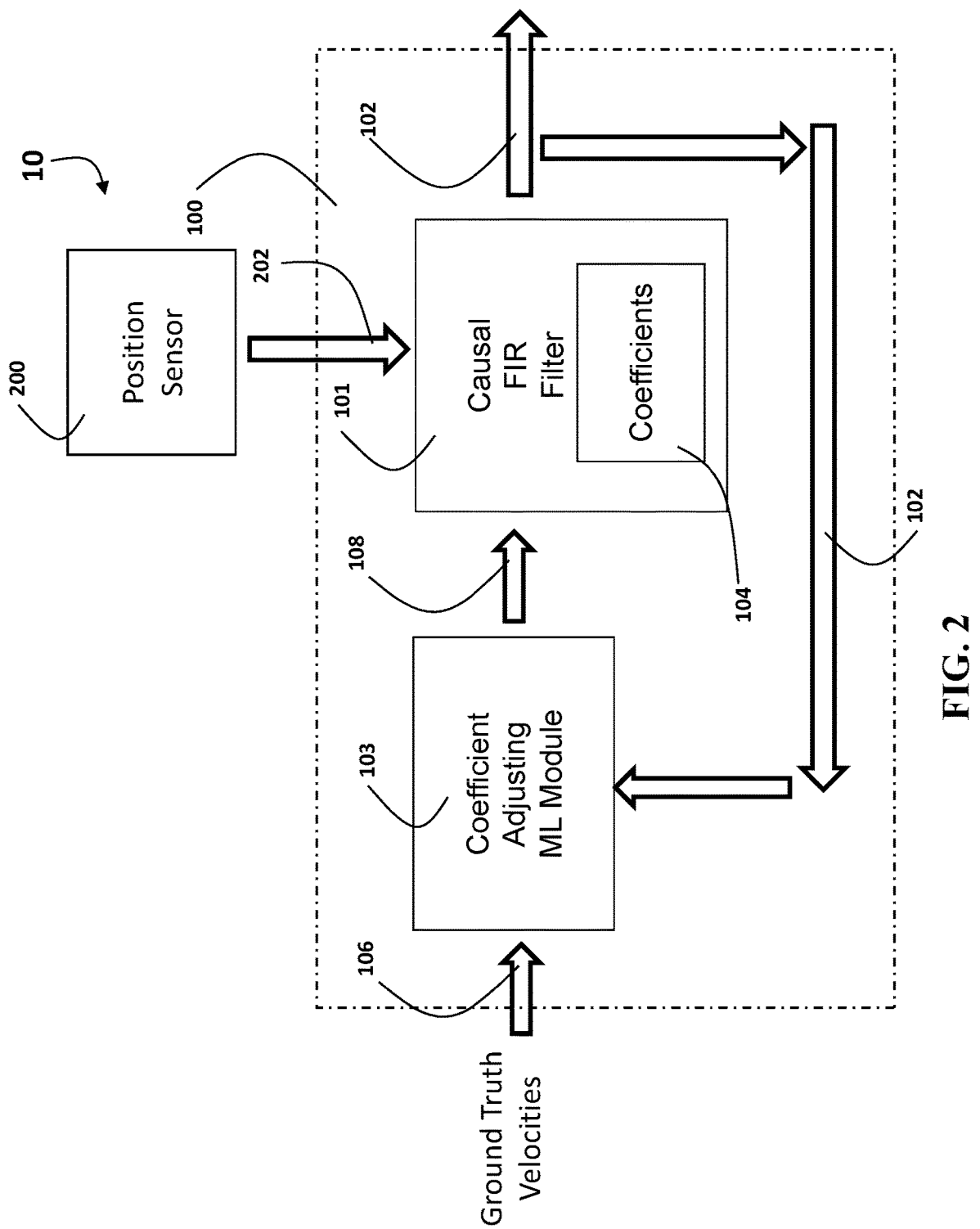
FIG. 2 illustrates a block diagram of a velocity monitor of an electro-mechanical system, according to some embodiments of the present disclosure.

FIG. 2 illustrates a block diagram of the velocity monitoring aspects of an electro-mechanical system 10, including the velocity monitor and the position sensor 200. The position sensor 200 is configured to capture position measurement data 202. The position measurement data 202 represents the position of the movable component 500 of the electro-mechanical system 10 as the component 500 performs the task 600. As shown in FIG. 2, the position sensor 200 provides real-time position measurement data 202 to aspects of the velocity monitor 100, including a causal FIR filter 101. The real-time position measurement data 202 may include linear or angular position information corresponding to one component of the electro-mechanical system 10 performing the task 600. The causal FIR filter 101 is configured to process the position measurement data 202 into a sequence of estimated velocities 102. The causal FIR filter 101 is configured to generate the estimated velocities 102 based on a series of coefficients 104 defining a frequency response of the causal FIR filter 101. The estimated velocities 102 may then be used by other aspects of the electro-mechanical system 10. For example, the estimated velocities 102 may be used by the feedback controller 300 as a feedback mechanism to regulate the movement of the component 500 of the electro-mechanical system 10.

The coefficients 104 of the casual FIR filter 101 define a frequency response of the causal FIR filter 101. Further, the coefficients 104 correspond to the specific task 600 being implemented. For example, the coefficients 104 associated with rotating a robotic arm 30 degrees in ten seconds will differ from the coefficients 104 associated with rotating the robotic arm 45 degrees in one second. Similarly, the coefficients 104 associated with rotating the robotic arm 30 degrees will differ from the coefficients associated with linearly translating the robotic arm 10 centimeters to move a 5 Newton load.

In order to produce accurate estimated velocities 102, the coefficients 104 of the causal FIR filter 101 must be adapted according to a sequence of ground truth velocities 106. The sequence of ground truth velocities 106 may be determined in a variety of ways as will be demonstrated with respect to subsequent figures. The ground truth velocities 106 are associated with the specific task 600 being performed by the monitored component of the electro-mechanical system 10. The ground truth velocities 106 and the estimated velocities 102 are provided to a coefficient adjusting machine learning (ML) module 103. The coefficient adjusting ML module 103 determines a series of differences between the ground truth velocities 106 and the estimated velocities 102. Based on this series of differences, the coefficient adjusting ML module 103 applies an adjustment signal 108 to the causal FIR filter 101 to adapt the coefficients 104 to reduce the series of differences according to one or more machine learning techniques. In some examples, the series of differences between the estimated velocities 102 and the ground truth velocities 106 may be analyzed in terms of a cumulative least mean-squared error between the estimated velocities 102 and the ground truth velocities 106.

Figure 3:
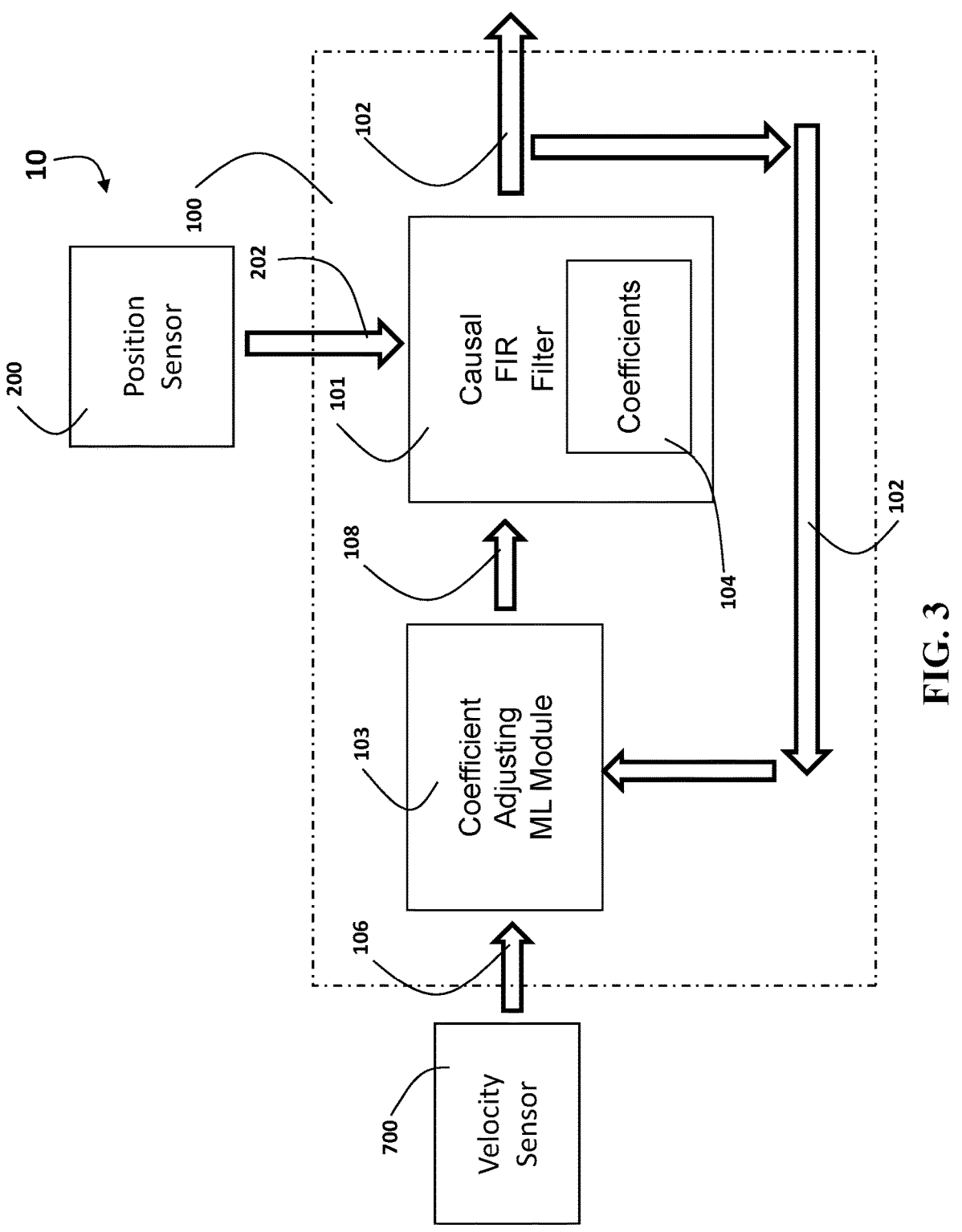
FIG. 3 illustrates a block diagram of a velocity monitor of an electro-mechanical system wherein ground truth velocities are provided by a velocity sensor, according to some embodiments of the present disclosure.

FIG. 3 shows a variation of the system 10 of FIG. 2 where the ground truth velocities 106 are provided by a velocity sensor 700, such as a tachometer, for offline adaptation of the causal FIR filter 101. In this example, the velocity sensor 700 may be temporarily used to measure the ground truth velocities 106 for the task being performed and to train the causal FIR filter 101 for future use. When the task 600 is performed, the coefficient adjusting ML module 103 may compare the estimated velocities 102 generated by the causal FIR filter 101 with the measured ground truth velocities 106 and generate the adjustment signal 108 to adapt the coefficients 104 of the causal FIR filter 101. Once the causal FIR filter 101 has been properly trained, the velocity sensor 700 could be removed, and the electro-mechanical system 10 may estimate velocities 102 of the monitored component without adapting the coefficients 104 of the causal FIR filter 101 in real time.

Figure 4A:
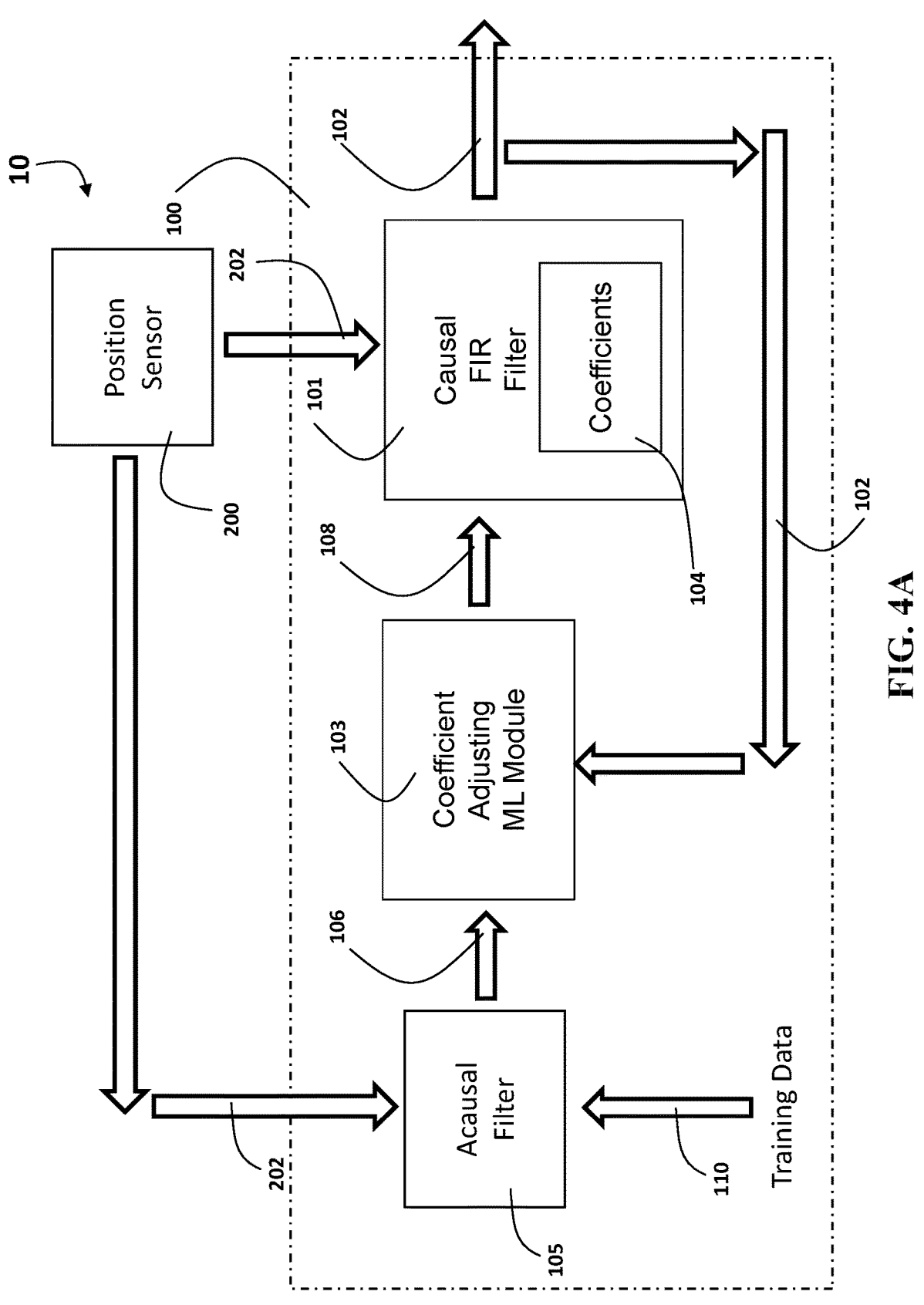
FIG. 4A illustrates a block diagram of a velocity monitor of an electro-mechanical system wherein ground truth velocities are provided by an acausal filter, according to some embodiments of the present disclosure.
Figure 4B:
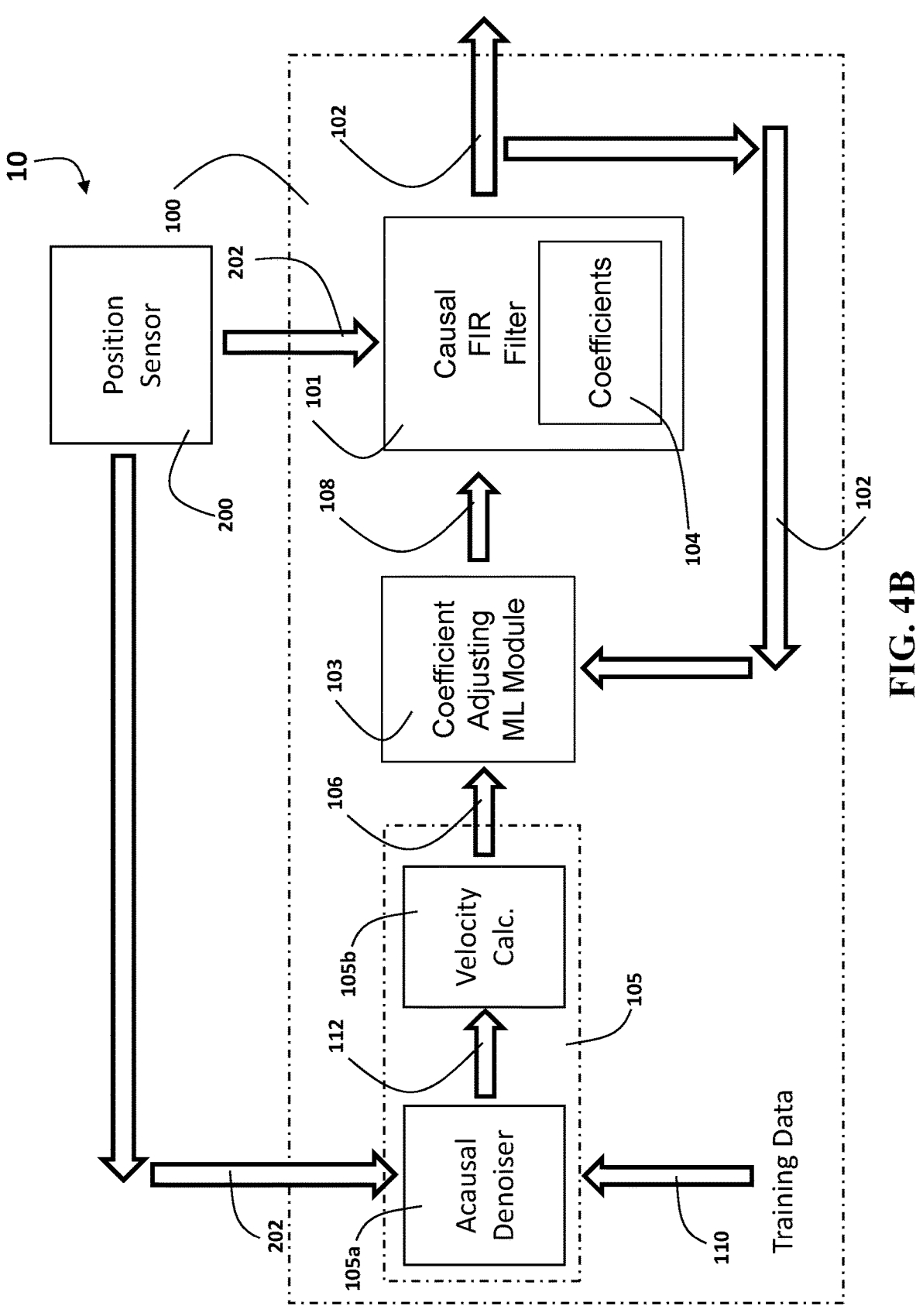
FIG. 4B illustrates a block diagram of the velocity monitor of FIG. 4A including additional aspects of the acausal filter, according to some embodiments of the present disclosure.

FIG. 4A shows a further variation of the system 10 of FIG. 2 where the ground truth velocities 106 are provided via an acausal filter 105, such as a Savitzky-Golay (SG) filter with a symmetric response. FIG. 4B illustrates the acausal filter 105 of FIG. 4A divided into two functional aspects, acausal denoiser 105a and velocity calculator 105b. The acausal filter 105 is configured to estimate ground truth velocities 106 based on the position measurement data 202 provided by the position sensor 200. In some examples, the acausal filter 105 generates ground truth velocities 106 via apriori denoising. When the acausal filter 105 has a symmetric (acausal) FIR, the acausal filter 105 has the property of removing noise from input data (in this case, the position measurement data 202) without introducing a lag in the estimate. By contrast, causal FIR filters, such as the causal FIR filter 101 of FIG. 4A, always necessarily introduce at least some temporal lag in their response. Some types of acausal filters, such as the Savitzky-Golay filter, fit a low-order polynomial to estimated ground truth positions 112 (such as denoised position measurement data 202). The ground truth velocities 106 may then be computed analytically as derivatives of the polynomial. In other examples, the ground truth velocities 106 may be computed by means of acausal central differencing of the ground truth positions 112. Accordingly, as shown in FIG. 4B, ground truth positions 112 are determined by denoising, via the acausal denoiser 105a, the position measurement data 202. The ground truth positions 112 are then determined, via the velocity calculator 105b, by the either by computing derivatives of the ground truth positions 112 or by acausal central differencing the ground truth positions 112. The acausal filter 105 may be configured according to training data 110. The training data 110 may include training position data to configure a frequency response of the acausal filter 105. Further, the training data 110 may be task specific, such that different sets of training data 110 may be provided for different tasks 600. Accordingly, the acausal filter 105 is trained offline using training data 110 to subsequently provide real-time ground truth velocities 106 while the electro-mechanical system 10 is online and operating.

Figure 5A:
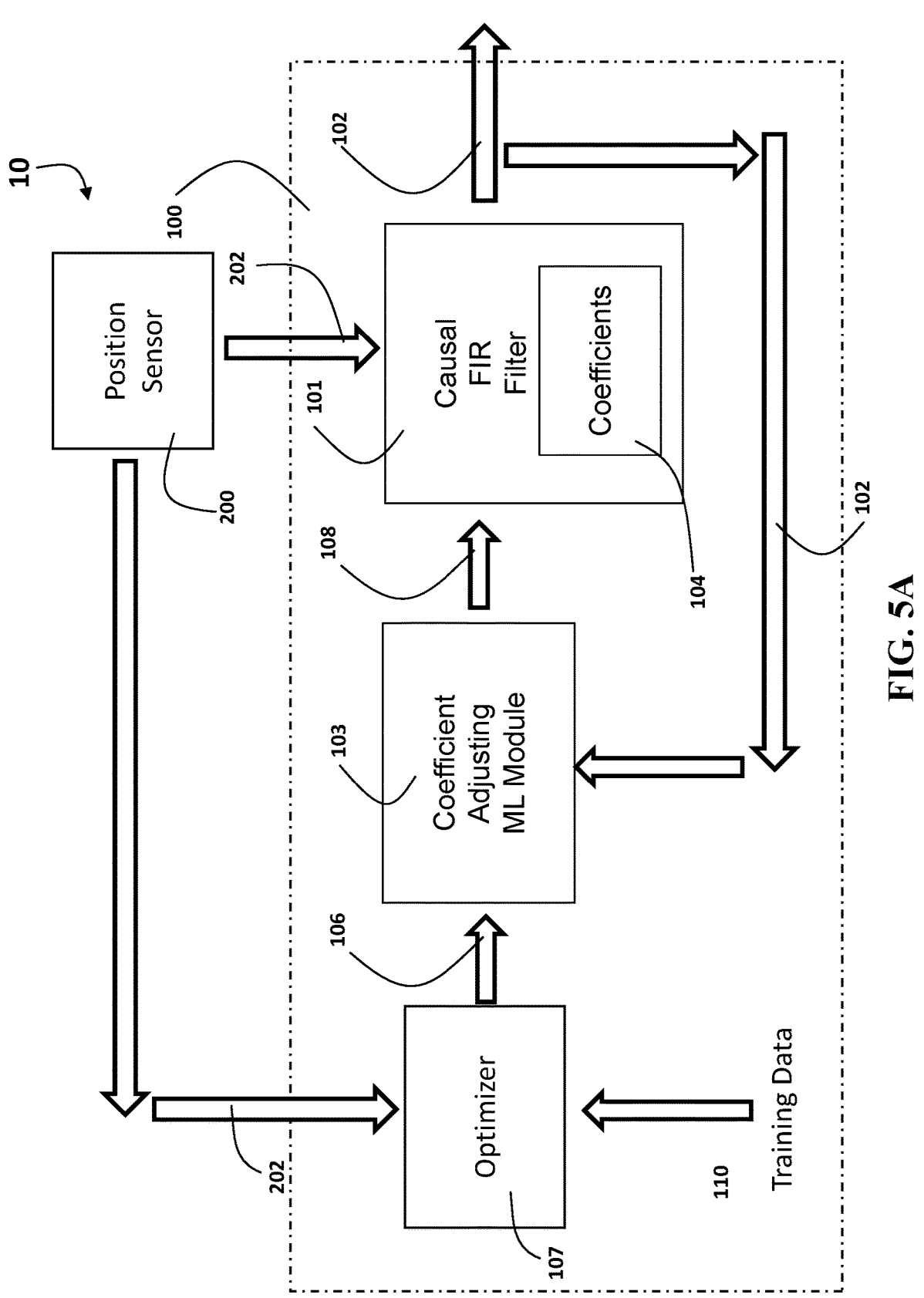
FIG. 5A illustrates a block diagram of a velocity monitor of an electro-mechanical system wherein ground truth velocities are provided by an optimizer, according to some embodiments of the present disclosure.
Figure 5B:
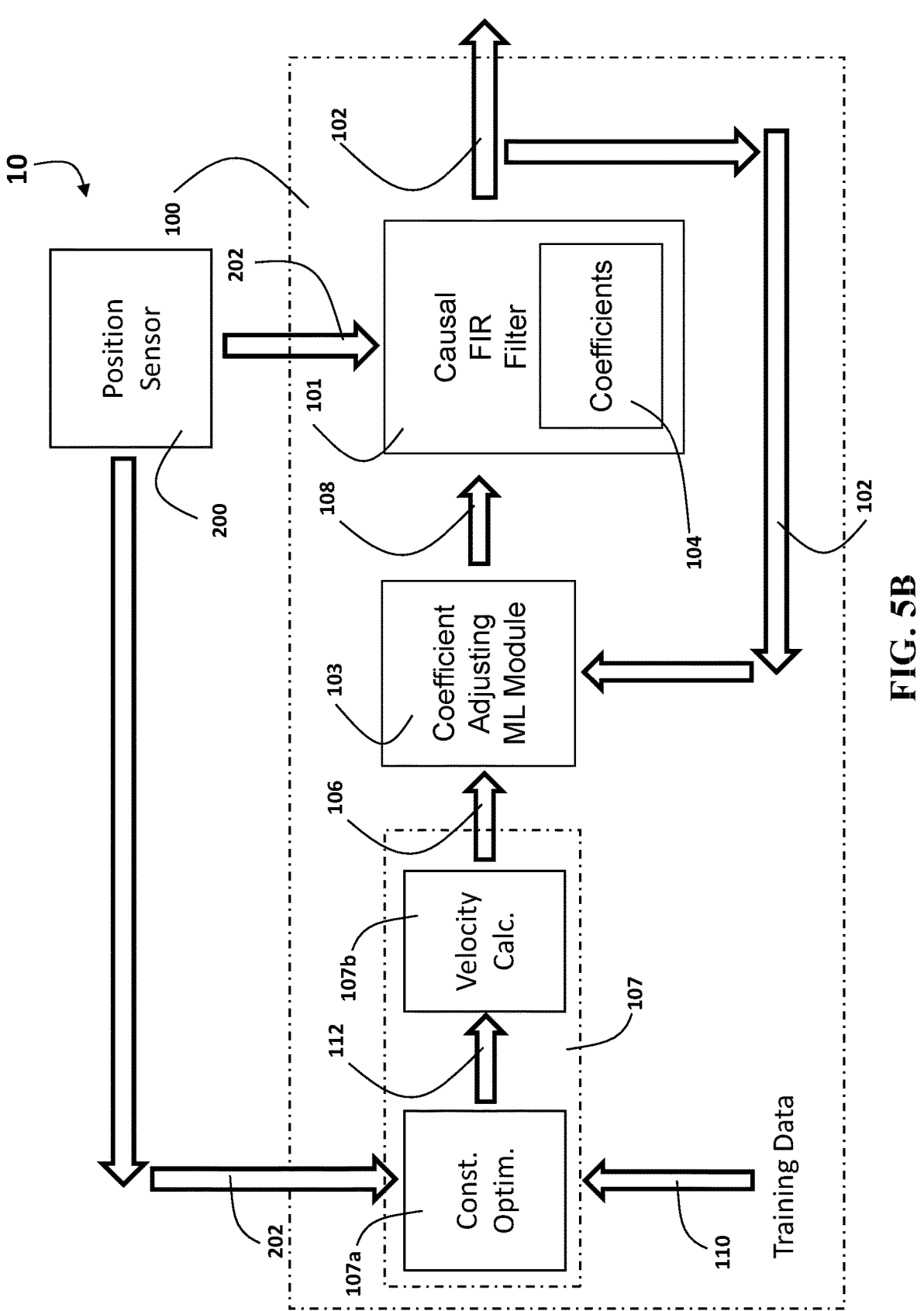
FIG. 5B illustrates a block diagram of the velocity monitor of FIG. 5A including additional aspects of the optimizer, according to some embodiments of the present disclosure.

FIG. 5A shows a further variation of the system 10 of FIG. 2 wherein the ground truth velocities 106 are determined based on a series of ground truth positions 112 computed by means of quadratic optimization. FIG. 5B illustrates the optimizer 105 of FIG. 5A divided into two functional aspects, constrained optimization problem 107a and velocity calculator 107b. In this variation, the ground truth positions 112 are the optimal values for the time series of position measurement data 202 computed by solving a constrained optimization problem 107a. The objective function of this optimization problem 107a is defined as the sum of the squares of the accelerations (second derivative) and/or the jerks (third derivative) of the computed numerically by means of finite differencing of the ground truth positions 112. The ground truth velocities 106 may then be determined by, for example, acausal central differencing.

Figure 6:
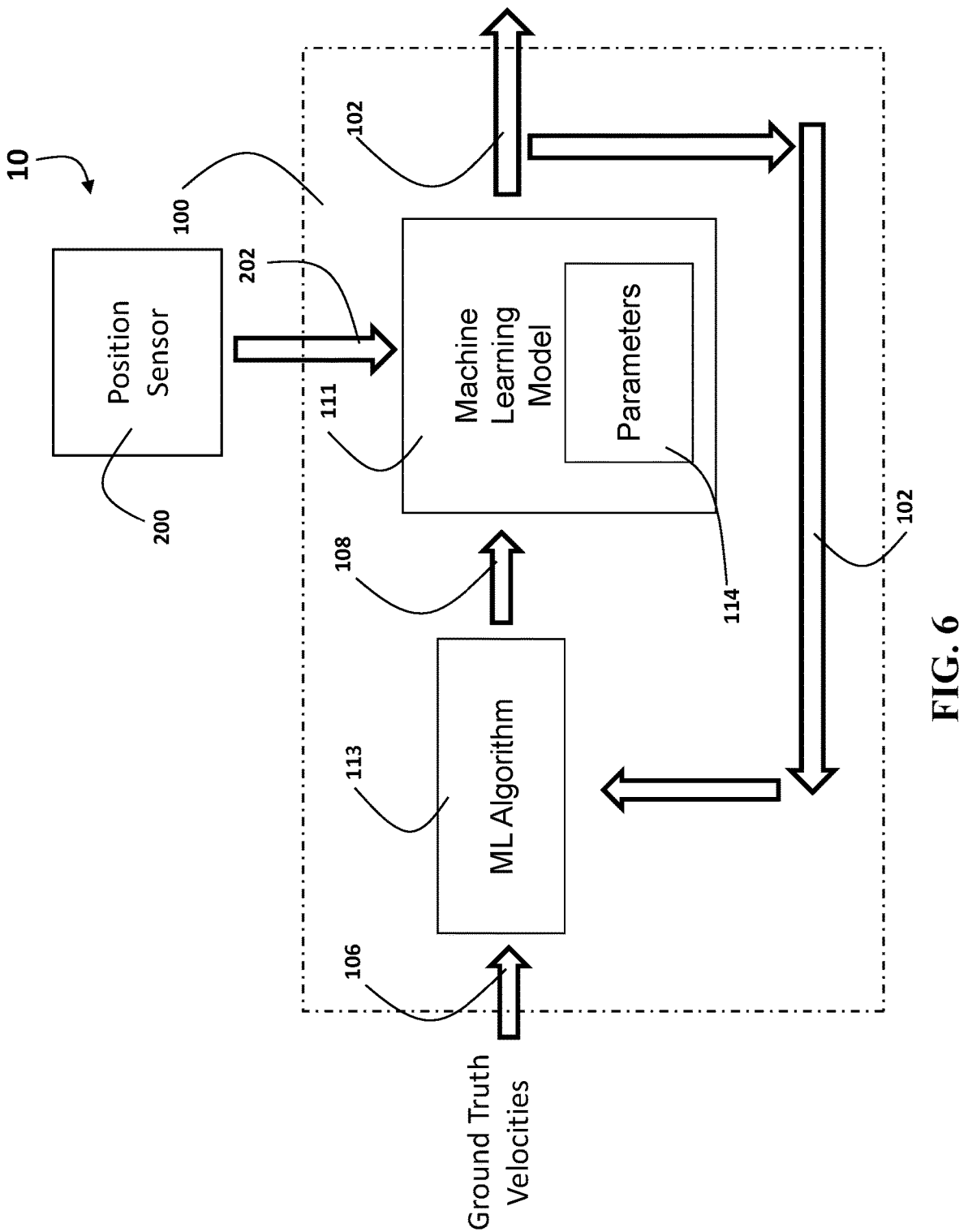
FIG. 6 illustrates a generalized block diagram of a velocity monitor, according to some embodiments of the present disclosure.

In the above figures, the generated adjustment signal 108 based on the ground truth velocities 106 and the estimated velocities 102 can be used to produce a causal velocity estimator according to a wide variety of different techniques. FIG. 2 shows the case when the causal velocity estimator is implemented as a causal FIR filter 101 parameterized by its coefficients 104 (also referred to as taps). The coefficients 104 are computed by coefficient adjusting ML module 103 by means of solving a least-squares problem. In a more general case, shown in FIG. 6, many other ML techniques can be used to this end, including, but are not limited to, linear regression fitting, neural network execution, moving least squares estimation, radial basis function smoothing, locally weighted scatterplot smoothing (LOWESS), smoothing spline learning, and Tikhonov smoothing. These techniques may be implemented by means of their corresponding ML model, parameterized by its own set of parameters 114 that are adjusted according to the respective machine learning algorithm 113. For example, if a neural network is used, the ML model 111 is the neural network itself, the parameters 114 are the weights of the ML model 111, and the parameter adjustment ML algorithm 113 could be the backpropagation algorithm commonly used to train neural networks.

Figure 7:
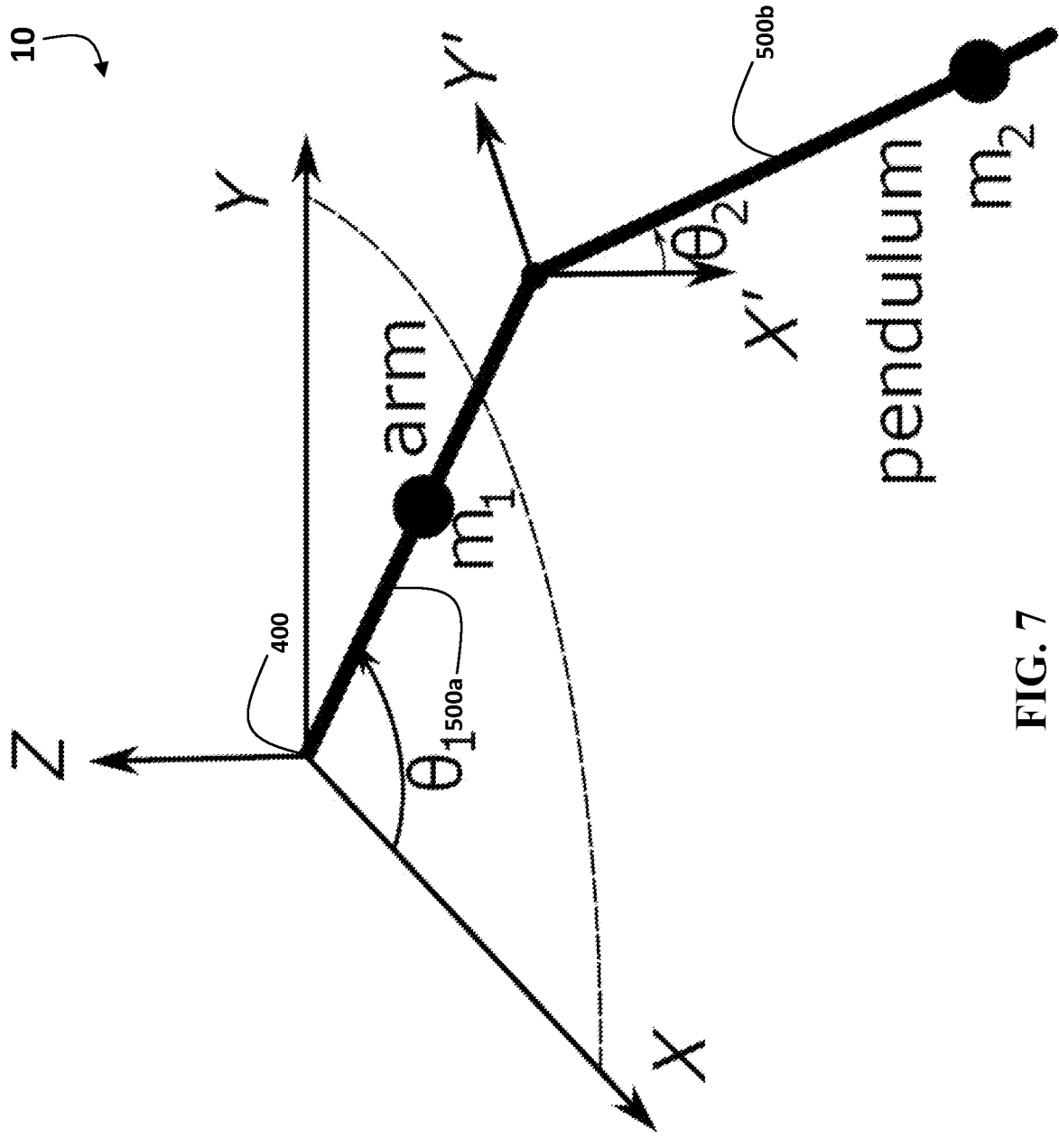
FIG. 7 illustrates an electro-mechanical system embodied as a rotary pendulum, according to some embodiments of the present disclosure.

FIG. 7 illustrates an example electro-mechanical system 10 as a rotary pendulum. The rotary pendulum is defined in terms of a first component 500a and a second component 500b. The first component 500a is an arm actuated around vertical axis Z by an actuator 400 applying a torque $\tau$. The position of the arm is defined as $\theta_1$, while the velocity of the arm is defined as $\dot{\theta}_1$. The second component 500b is a pendulum hanging freely (without actuation) from the arm in a plane perpendicular to the arm. The position of the pendulum is defined as $\theta_2$, while the velocity of the pendulum is defined as $\dot{\theta}_2$.

In one example, a first task 600a may be applied to the system 10 to rotate the first component 500a, embodied as the arm, clockwise by 45 degrees. Using the velocity monitor 100 shown in FIGS. 1-6, the velocity of the arm may be tracked via a position sensor 200, such as an encoder, capturing angular position measurement data 202 ($\theta_1$) corresponding to the arm. This position measurement data 202 is then provided to a causal FIR filter 101 of the velocity monitor 100 to generate estimated velocities 102 for the arm. The causal FIR filter 101 is defined by the series of coefficients 104 which have been adapted according to the coefficient adjusting ML module 103 of the velocity monitor 100. The coefficient adjusting ML module 103 adapts the coefficients 104 in real time by comparing the estimated velocities 102 to the ground truth velocities 106 corresponding to rotating the arm by 45 degrees. As illustrated with respect to FIGS. 3 and 4, the ground truth velocities 106 may be determined through measurement by the velocity sensor 700 or by the acausal filter 105 of the velocity monitor 100. The acausal filter 105 is trained according to training data 110 corresponding to the first task 600a of rotating the arm by 45 degrees. The estimated velocities 102 may then be provided to the feedback controller 300 to generate a control command signal 302 to control the actuator 400 and regulate the rotation of the arm. A similar analysis may be performed to regulate the movement of the second component 500b, embodied as the pendulum, based on a series of estimated velocities 102b.

A second task 600b may then be applied to the system 10 to rotate the arm counterclockwise by 30 degrees. As before, the position sensor 200 generates position measurement data 202b corresponding to the motion of the arm according to the second task 600b. The position measurement data 202b is then provided to the causal FIR filter 101 to generate estimated velocities 102b according to the series of coefficients 104. These coefficients 104b are adapted specifically for the second task 600b by comparing the estimated velocities 102 to the ground truth velocities 106 for the second task 600b. For example, the ground truth velocities 106 may be captured by the velocity sensor 700 (such as a tachometer) during the performance of the second task 600b. In other examples, the ground truth velocities 106 are determined in real time by the acausal filter 105 which has been previously trained according to training data 110 corresponding to the second task 600b.

Figure 8:
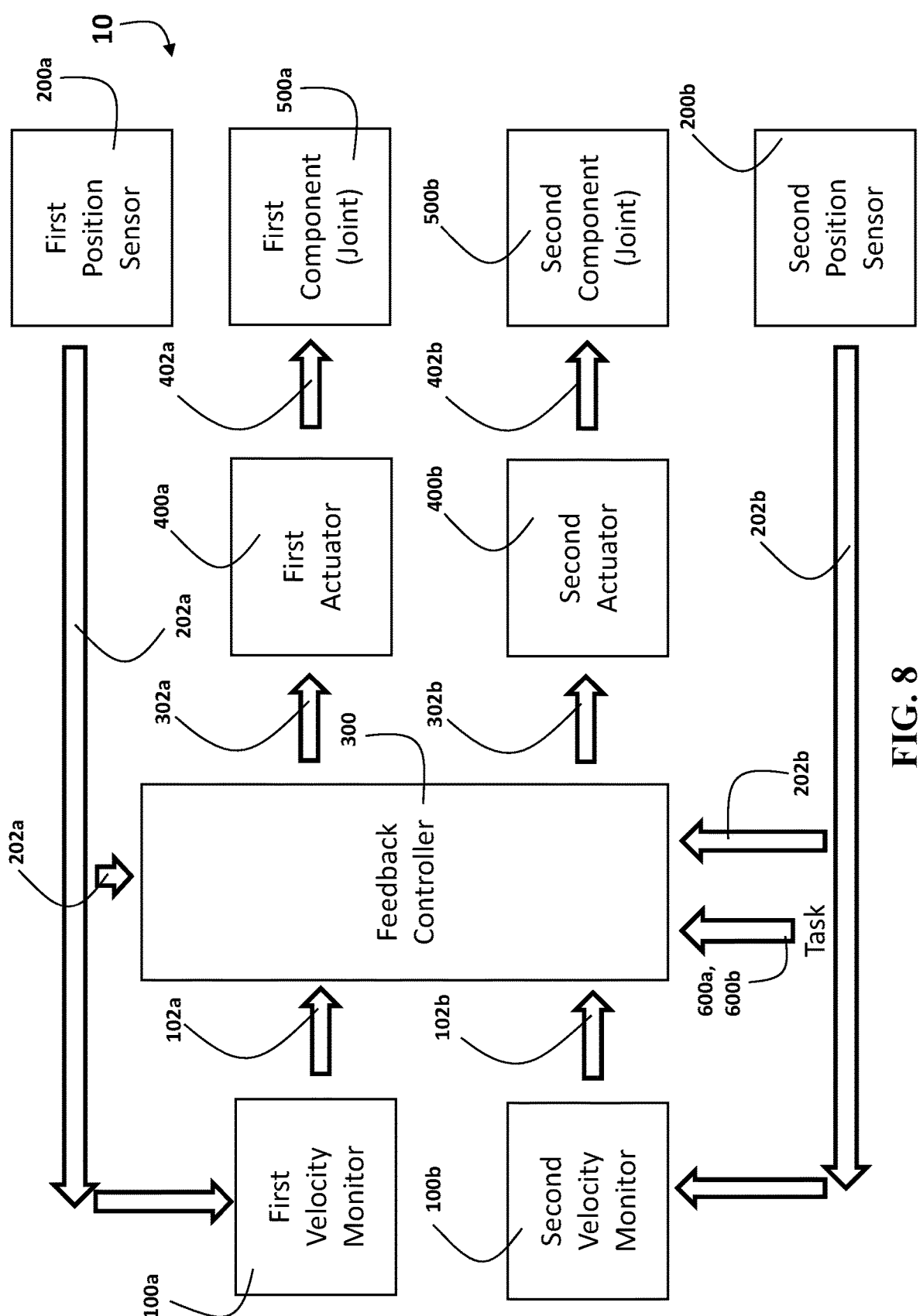
FIG. 8 illustrates a block diagram of an electro-mechanical system including multiple actuating components, according to some embodiments of the present disclosure.

FIG. 8 illustrates an example electro-mechanical system 20 having multiple velocity monitors 100a, 100b, position sensors 200a, 200b, actuators 400a, 400b and components 500a, 500b. In the example of FIG. 8, a feedback controller 300 is configured to control the components 500a, 500b according to multiple tasks 600a, 600b. In the example of FIG. 8, each of the components 500a, 500b may be embodied as a joint defined by a mass. In some examples, the mass of the first component 500a may be different (greater than or less than) the mass of the second component 500b.

In the non-limiting example of FIG. 8, the electro-mechanical system 10 is excited by the feedback controller 300 providing a first control command signal 302a to the first actuator 400a. The first control command signal 302a may be generated based on a first task 600a. The first actuator 400a applies a first actuation force 402a to the first component 500a based on the control command signal 302a. The first position sensor 200a, such as an encoder, captures first position measurement data 202a based on the movement of the first component 500a. The first position measurement data 202a is provided to a first velocity monitor 100a which generates a sequence of estimated velocities 102a corresponding to the motion of the first component 500a. Aspects of an example of the first velocity monitor 100a are shown in FIG. 8. The feedback controller 300 then uses the estimated velocities 102a and the first position measurement data 202a to regulate the first control command signal 302a to ensure the first component 500a is moving as desired according to the first task 600a.

Similarly, the feedback controller 300 also provides a second control command signal 302b to the second actuator 400b. Like the first control command signal 302a, the second control command signal 302b may be generated based on a first task 600a. The second actuator 400b applies a second actuation force 402b to the second component 500b based on the control command signal 302b. In some examples, the first task 600a may cause both of the first and second components 500a, 500b to move similarly, such as each rotating clockwise by 30 degrees. In other examples, the first task 600a may define an overall motion for the electro-mechanical system 20 which requires the first and second components 500a, 500b to move differently to accomplish the overall desired motion. For example, the first task 600a may require the first component 500a to rotate 30 degrees clockwise, and the second component 500b to rotate 45 degrees counterclockwise.

Figure 9:
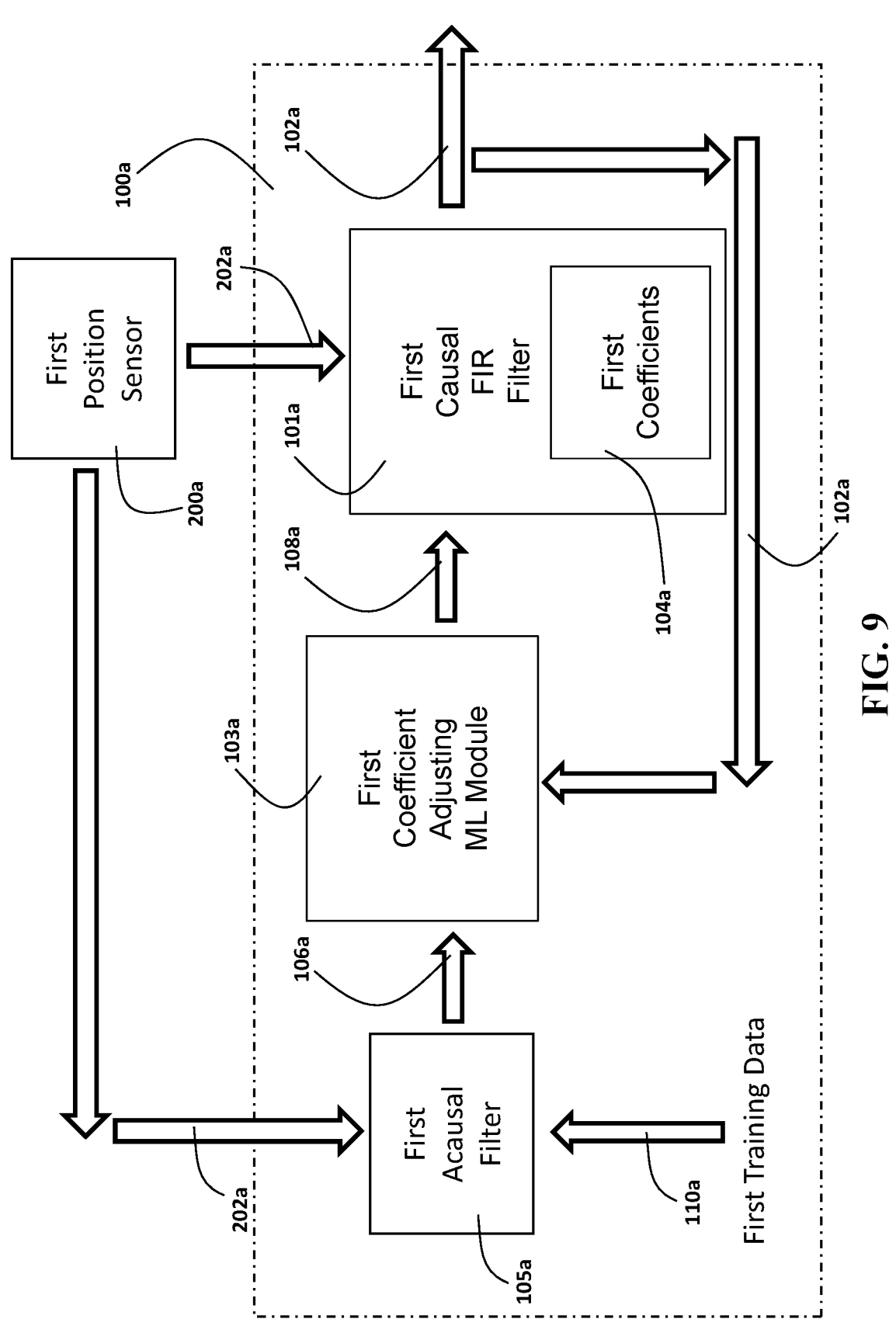
FIG. 9 illustrates a block diagram of a first velocity monitor of an electro-mechanical system, according to some embodiments of the present disclosure.

The second position sensor 200b captures second position measurement data 202b based on the movement of the second component 500b. The second position measurement data 202b is provided to a second velocity monitor 100b which generates a second sequence of estimated velocities 102b corresponding to the motion of the second component 500b. Aspects of an example of the second velocity monitor 100b are shown in FIG. 9. The feedback controller 300 then uses the estimated velocities 102b and the second position measurement data 202b to regulate the second command control signal 302b to ensure the second component 500b is moving as desired according to the first task 600a. When a second task 600b is provided to the feedback controller 300, the aforementioned processes continue with the actuators 400a, 400b moving the components 500a, 500b according to the control command signals 302a, 302b generated by the feedback controller 300.

Figure 10:
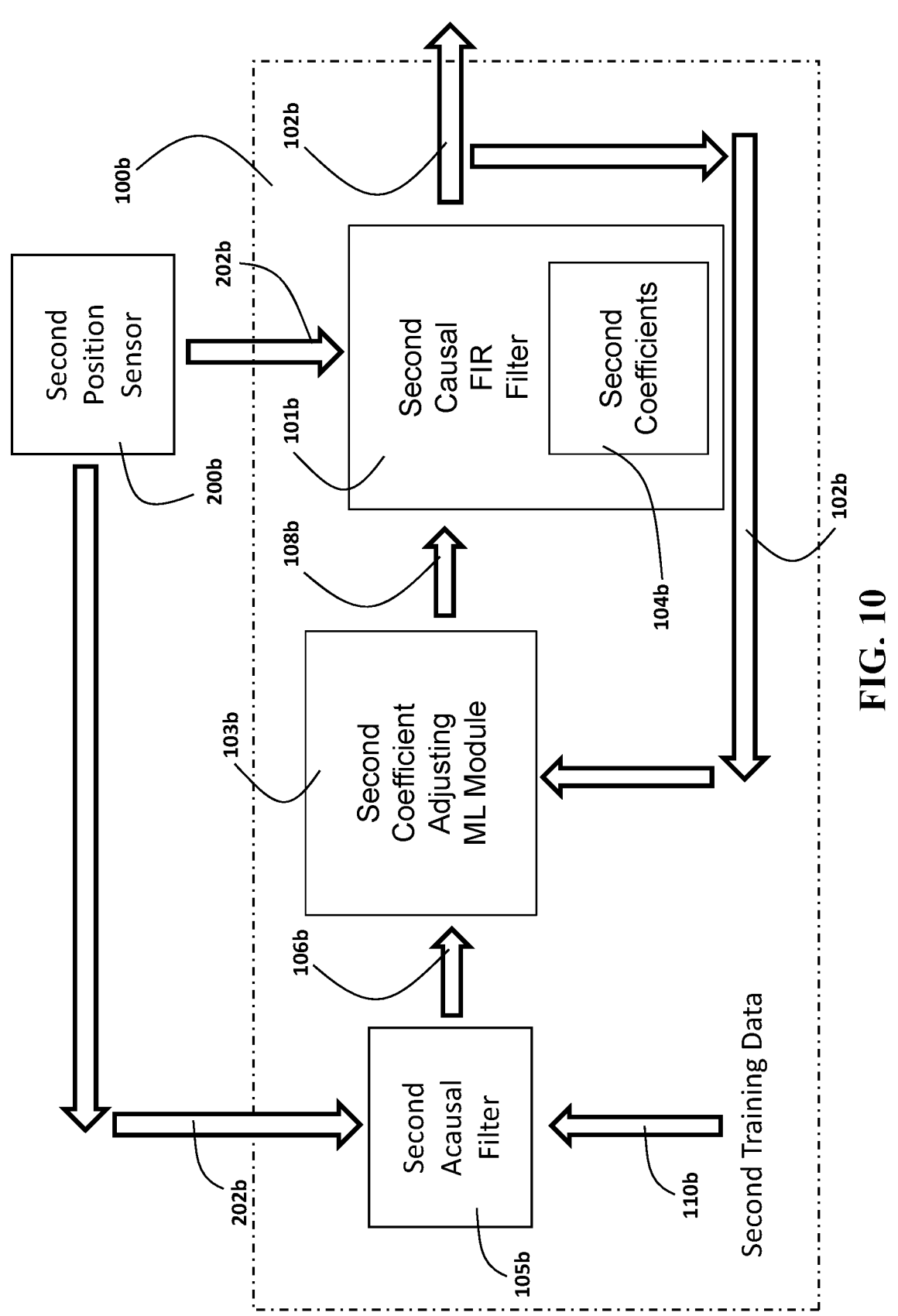
FIG. 10 illustrates a block diagram of a second velocity monitor, according to some embodiments of the present disclosure.

FIG. 9 illustrates the first velocity monitor 100 of FIG. 8, while FIG. 10 illustrates the second velocity monitor 100 of FIG. 8. As shown in FIG. 9, the first velocity monitor 100a includes a first causal FIR filter 101a, a first coefficient adjusting ML module 103a, and a first acausal filter 105a. The first causal FIR filter 101a receives first position measurement data 202a from the first position sensor 200a. The first causal FIR filter 101a then generates the first sequence of estimated velocities 102a by processing the first position measurement data 202a according to a frequency response defined by the first coefficients 104a. The first position measurement data 202a is also provided to the first acausal filter 105a. The first acausal filter 105a may be trained offline according to first training data 110a. The first acausal filter 105a processes the first position measurement data 202a to generate the first sequence of ground truth velocities 106a via apriori denoising. Accordingly, the estimated velocities 102a should approximate the ground truth velocities 106a. A first coefficient adjusting ML module 103a then compares the first sequence of ground truth velocities 106a to the first sequence of estimated velocities 102a. The first coefficient adjusting ML module 103a then provides the first causal FIR filter 101a with a first adjustment signal 108a. The first adjustment signal 108a modifies the first coefficients 104a of the first causal FIR filter 101a to reduce the difference between the ground truth velocities 106a and the estimated velocities 102a.

As shown in FIG. 10, the second velocity monitor 100b includes a second causal FIR filter 101b, a second coefficient adjusting ML module 103b, and a second acausal filter 105b. The second causal FIR filter 101b receives second position measurement data 202b from the second position sensor 200b. The second causal FIR filter 101b then generates the first sequence of estimated velocities 102a by processing the second position measurement data 202b according to a frequency response defined by the second coefficients 104b. The second position measurement data 202b is also provided to the second acausal filter 105*b*. The second acausal filter 105*b* may be trained offline according to second training data 110*b*. The second acausal filter 105*b* processes the second position measurement data 202*b* to generate the second sequence of ground truth velocities 106*b* via apriori denoising. Accordingly, the estimated velocities 102*b* should approximate the ground truth velocities 106*b*. A second coefficient adjusting ML module 103*b* then compares the second sequence of ground truth velocities 106*b* to the second sequence of estimated velocities 102*b*. The second coefficient adjusting ML module 103*b* then provides the second causal FIR filter 101*b* with a second adjustment signal 108*b*. The second adjustment signal 108*b* modifies the second coefficients 104*b* of the second causal FIR filter 101*b* to reduce the difference between the ground truth velocities 106*b* and the estimated velocities 102*b*.

It should be noted that various aspects of the first velocity monitor 100*a* may differ from the second velocity monitor 100*b*. For example, the acausal filters 105*a*, 105*b* may be trained according to different training data 110*a*, 110*b*, resulting in different filter responses customized for the corresponding component 500*a*, 500*b* and/or task 600*a*, 600*b*. Moreover, the two acausal filters 105*a*, 105*b* may operate at very different sampling rates, and their corresponding position sensors 200*a*, 200*b* may have very different resolutions, resulting in very different quantization errors. Further, the coefficients 104*a*, 104*b* of the causal FIR filters 101*a*, 101*b* may vary in terms of coefficient values and coefficient quantity. Thus, if the first causal FIR filter 101*a* has more coefficients 104*a* than the second causal FIR filter 101*b*, then a first size of the first causal FIR filter 101*a* is considered to be greater than a second size of the second causal FIR filter 101*b*.

Adaptive Velocity Estimators for Learning Control

Velocity estimation plays an important role in the control of many mechanical systems whose state is described by both position variables (angles or distances) as well as velocities (angular or linear). More often than not, dedicated velocity sensors (such as tachometers) are not available, and the velocities need to be estimated from position sensors, most commonly rotary encoders. Encoders introduce quantization noise which depends on the resolution of the encoder. This noise, when added to the actual velocity signal, ends up creating a disturbance in the control signal that can significantly worsen the performance of the controller and even render it unstable. As the cost of encoders increases sharply with their resolution, there is a strong economic motivation to develop effective velocity estimation methods that can mitigate the effect of quantization noise on the estimated velocities. In contrast to spatial resolution, increasing the temporal resolution of the estimation process (the sampling rate of the encoder) is much more economical due to the ever-increasing computational capabilities of modern microcontrollers. The question then arises whether higher temporal resolution can be leveraged to compensate for limited spatial resolution of velocity estimation. The answer to this question is, though, not straightforward, because directly increasing the sampling rate without changing the velocity estimation scheme will actually amplify the estimation error due to quantization, and not reduce it. Consequently, it becomes important to devise new methods for improved velocity estimation that take advantage of higher sampling rates, and this disclosure proposes one such method.

If a state-space model of the controlled component is available, a suitable velocity observer can be designed by leveraging the model. However, in learning control applications, such a state-space model is not available; rather, it is the objective of the learning algorithm to learn such a model from observations (for model-based methods) or learn directly a control law (also called a policy in the field of reinforcement learning (RL), for model-free methods) that maps the measured or estimated state variables to the control variables. Such learning algorithms must use apriori velocity estimators that are not informed by the component's model.

This raises the question of which velocity estimator method is optimal and advantageous to use, and a significant amount of research has been performed on the performance of various velocity estimators. As velocity is the first derivative of position, this is an instance of the more general problem of differentiating a digital signal $x[k]=x(t_k)$ sampled at discrete moments in time $t[k]$, $k=0, \ldots, N-1$ and corrupted by general noise. The simplest and most fundamental velocity estimator is the first-order backward difference estimator (BDE), defined as the ratio of the difference between consecutive samples of the signal and the time elapsed between them:

$$\hat{v}[k]^{BDE} \triangleq \frac{\Delta x[k]}{T[k]},$$

where $\Delta x[k] \triangleq x[k]-x[k-1]$ and $T[k] \triangleq t[k]-t[k-1]$. When the true positions $x^{(true)}[k]$ have been corrupted by independent and identically distributed (i.i.d.) quantization noise $\epsilon[k]$, such that $x[k]=x^{(true)}[k]+\epsilon[k]$, the difference $\Delta\epsilon[k] \triangleq \epsilon[k]-\epsilon[k-1]$ is propagated into the velocity estimate as $\Delta\epsilon[k]/T[k]$, manifesting itself as velocity estimation error. For control applications, the sampling period $T[k]$ is often the inverse of the control rate F, meaning that that rate effectively amplifies the quantization noise of the encoder. Furthermore, if, for example, a linear feedback controller multiplies the velocity estimate by a velocity gain $k_v$, the resulting additive disturbance to the control signal will be equal to $k_v F\Delta\epsilon[k]$. Depending on the gain, the control rate, and the quantization error, this disturbance might be very large and completely dwarf the other components of the control signal, especially at low velocities, rendering the control system unstable.

Given the deleterious effect of higher sampling rates on the velocity estimation error and the resulting induced disturbance in the control signal, the simplest solution would be to resort to slower sampling rates. However, this would ignore information in the encoder position signal that might be instrumental in more accurate estimation. A much better solution might be to try to make better use of multiple position readings sampled at a high control rate. To this end, a number of more advanced velocity estimators have been proposed. A Taylor series expansion (TSE) of the velocity signal leads to a series of estimators of arbitrary order. Similarly, the BDE estimators can be extended to an arbitrary order. The first- and second-order TSE and BDE estimators are the same, and differences appear only in the third- and higher-order terms. In practical applications, at most third-order estimators are usually used. Both TSE and BDE estimators can be implemented as causal linear finite impulse response (FIR) filters, either on the raw position measurement $x[k]$ or on the differences $\Delta x[k]$. A different, and computationally much more intensive approach is to fit a low-order polynomial to the latest readings using least-squares fitting (LSF), differentiate it analytically, and evaluate the derivative at the most recent point in time to obtain a velocity estimate. Variants of these estimators exist when the encoders are not sampled at fixed time steps, but produce a sample only when their position reading changes by a fixed amount, typically one tick of the encoder.

Looking back at the long research into optimal velocity estimators, it becomes clear that no single estimator has proved to be best for all applications and systems. This should come as no surprise, as the performance of these estimators, and most notably their ability to suppress quantization noise and serve in feedback control applications, depends critically on the properties of the system whose velocity is being measured. The most important among these properties is the bandwidth of the system, which determines the frequency range within which the measured velocities are going to lie. For a system of zero bandwidth, that is, always moving at a constant velocity, the best estimate of that velocity would be simply the average velocity $$\bar{v}[k] = \frac{x[k] - x[0]}{t[k] - t[0]}$$

since the start; by dividing the difference $(\epsilon[k]-\epsilon[0])$ between the i.i.d. quantization errors in the first and last readings by the largest possible time interval, $(t[k]-t[0])$, the quantization noise would be suppressed most effectively. This operation is also equivalent to passing the position differences $\Delta x[i]$, $i=1, \ldots, k$ through an FIR filter of order k with coefficients all equal to $1/k$. However, this kind of very high-order causal filter will cause a huge phase shift in the estimated signal for all non-zero frequencies, and because it will act in sequence with the feedback controller if used for control purposes, it will likely affect its phase margin very negatively. So, for systems exhibiting high-frequency velocities, there might be no other choice but to use a velocity estimator of the lowest possible order. That is, various velocity estimators provide a different trade-off between suppression of quantization noise and phase lag, and which one is better for a particular system depends on the bandwidth of the system, which is typically unknown in learning control applications.

Based on this realization, this disclosure proposes a method for adaptively constructing a velocity estimator that is tailored to the properties of a target system to which learning control is being applied. Similar to TSE and BDE estimators, the resulting estimator is an FIR filter that acts on the measured encoder position differences, but unlike these estimators, its order and coefficients are learned from data, using standard machine learning (ML) methodology. In the spirit of learning control methods, it applies ML technology beyond its usual uses for system identification and policy learning, to the problem of velocity estimation.

Learning Velocity Estimators

The overall idea of the disclosed systems and methods of the present disclosure is to excite a target system by means of a suitable excitation policy, collect position sensor (encoder) data, and learn a suitable estimator in the form of a causal FIR filter. Later, the filter is used to estimate velocities while learning a model of the system for the purpose of model-based controller design, or direct determination of a control policy based on position and velocity readings. Finally, the same filter is used when deploying the learned control policy. The method is also compatible with control designs that are based on an approximate state-space model of the plant, whose accuracy is sufficient for a controller design with acceptable performance, but insufficient for designing a model-based observer of velocity.

The method is based on the realization that many known velocity estimators, such as Taylor Series Expansion (TSE) and Backward Difference Estimator (BDE) estimators, are essentially weighted moving averages of the position differences $\Delta x[k]$ of the position data stream, as provided by position encoders. The weights of the moving average can be represented conveniently as the impulse response $h_i$, $i=0$, $n-1$ of an FIR filter of order n, where n is the order of the velocity estimator, and the velocity estimate is the result of convolving the impulse response with the signal of position differences:

$$\hat{v}_k = h_0\Delta x[k] + \ldots + h_{n-1}\Delta x[k-n+1] = \sum_{i=0}^{n-1} h_i\Delta x[k-i] \quad (1)$$

The only difference between TSE and BDE estimators is in what kind of impulse response $h=[h_0, h_1, \ldots, h_{n-1}]$ they use. For example, the first order TSE(1) and BDE(1) filters use, trivially, $h=[1]$. Their second-order variants, TSE(2) and BDE(2), use the same convolution kernel, $h=[1.5,-0.5]$. Differences between TSE and BDE gradually appear in the higher-order filters. However, in practical applications, it is not clear why one kernel should be preferred to another of the same, or for that matter, a different order.

The present disclosure proposes to make this decision based on collected data, and moreover, use that data to find the actual optimal kernel h that is best for the system from which the data was collected, in the expectation that this kernel will generalize to novel data from the same system, as is customary in the field of machine learning. To this end, the following machine learning problem is formulated. Given a sequence of position differences $\Delta x[k]$, $k=1$, N−1, best off-line estimates $\hat{v}^{(o)}[k]$ of the velocities at the same time moments, and a desired FIR filter order n, find the values of the impulse response $h=[h_0, h_1, \ldots, h_n-1]$ that minimize the mean-squared prediction error of the velocities:

$$h^{(LSE)} = \arg\min_h \sum_{k=n+1}^{N-1} \left( \hat{v}^{(o)}[k] - \sum_{i=0}^{n-1} h_i\Delta x[k-i] \right)^2 \quad (2)$$

It can immediately be recognized that this is a least-squares estimation (LSE) problem that can be solved in many ways, for example by forming the time-lag matrix X of dimensions N−n+1×n, such that $X_{ij}=\Delta x[i-j+n]$, the column vector v of dimension N−n+1, such that $v_i=\hat{v}^{(o)}[k]$, and computing $$h^{(LSE)} = \left(X^T X\right)^{-1} X^T v = X^+ v \quad (3)$$

making use of the pseudo-inverse $X^+=(X^T X)^{-1}X^T$. It should be noted that $h^{(LSE)}$ is the maximum likelihood estimate (MLE) of the optimal FIR kernel only if the noise in the FIR estimate of velocity in (2) was i.i.d. Gaussian. One component of this noise is the weighted sum of the quantization errors of each reading participating in the convolution operation, and it can be recognized that the probability distribution of each error term is not Gaussian, but uniform, with support set of width one sector of the position encoder. For large values of n, for example n>30, the Central Limit Theorem (CLT) applies, and the Gaussian error assumption is justified, whereas for lower orders n, it is not entirely so.

A more advanced estimation method might attempt to solve the minimization problem in equation (2) by means of constrained optimization, as opposed to using a pseudo-inverse matrix.

The estimates of the velocity $\hat{v}^{(o)}[k]$ needed for the LSE problem can be obtained from the sampled data set by means of a suitable acausal filter, for example the popular Savitzky-Golay (SG) filter. The advantage of using this kind of acausal FIR filtering is that, if designed properly, it introduces no lag, in contrast to the causal FIR filters implementing the run-time velocity estimators. This process takes advantage of the fact that it is performed off-line, after the entire data set has been collected. This approach, known as apriori denoising, is standard practice in the field of system identification and can also employ other, more advanced filtering schemes, such as moving least squares, radial basis function smoothing, LOWESS, smoothing splines, Tikhonov smoothers, etc. In addition, model selection methods such as generalized cross validation and Pareto curves can be used to select the model order and its optimal hyperparameters. The estimation error of the estimated velocities $\hat{v}^{(o)}[k]$ with respect to the true unknown velocities v [k] is another component of the LSE fitting error implied in equation (2), and because SG filtering is usually performed on rather wide windows, involving relatively many data samples, the probability distribution of the cumulative error in equation (2) will further approach a Gaussian one by virtue of the CLT, justifying the use of LSE.

In summary, the idea of the method of the present disclosure is to use least squares estimation to find an optimal causal FIR filter for estimating velocities at run-time, using off-line velocity estimates obtained from collected data filtered by means of an acausal filter. The result is an estimator that is tailored to the properties of the controlled system, with the ability to suppress as much of the quantization noise as possible, without filtering out the actual velocity signal.

FIG. 11 is a flow chart of a method 900 for adapting a causal FIR filter. The causal FIR filter is configured to estimate velocities by filtering position measurement data in accordance with a frequency response of an electro-mechanical system involved in a task.

The method 900 includes, in step 910, collecting a sequence of position measurement data and a corresponding sequence of ground truth velocities of a component of the electro-mechanical system performing the task.

The method 900 further includes, in step 920, adapting the causal FIR filter for estimating velocities of the component performing the task by updating one or more coefficients of the causal FIR filter to reduce a difference between the sequence of ground truth velocities and estimated velocities produced by filtering the sequence of position measurement data by the adapted causal FIR filter.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The above-described examples of the described subject matter can be implemented in any of numerous ways. For example, some aspects can be implemented using hardware, software or a combination thereof. When any aspect is implemented at least in part in software, the software code can be executed on any suitable processor or collection of processors, whether provided in a single device or computer or distributed among multiple devices/computers.

The present disclosure can be implemented as a system, a method, and/or a computer program product at any possible technical detail level of integration. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some examples, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

The computer readable program instructions can be provided to a processor of a, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other implementations are within the scope of the following claims and other claims to which the applicant can be entitled.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific examples described herein. It is, therefore, to be understood that the foregoing examples are presented by way of example only and that, within the scope of the appended claims and equivalents thereto, examples can be practiced otherwise than as specifically described and claimed. Examples of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

What is claimed is:

1. A method for adapting a causal finite impulse response (FIR) filter, wherein the causal FIR filter is configured to estimate velocities by filtering position measurement data in accordance with a frequency response of an electro-mechanical system involved in a task, wherein the method uses a processor coupled with stored instructions implementing the method, wherein the stored instructions, when executed by the processor, carry out steps of the method, comprising:

collecting a sequence of position measurement data and a corresponding sequence of ground truth velocities of a component of the electro-mechanical system performing the task;

adapting the causal FIR filter for estimating velocities of the component performing the task by updating one or more coefficients of the causal FIR filter to reduce a difference between the sequence of ground truth velocities and estimated velocities produced by filtering the sequence of position measurement data by the adapted causal FIR filter; and actuating the component of the electro-mechanical system according to a control command, wherein the control command is derived at least partially based on the estimated velocities.

2. The method of claim 1, further comprising determining the sequence of ground truth velocities corresponding to the sequence of position measurement data by:

processing the sequence of position measurement data with an acausal filter to generate a sequence of ground truth positions; and acausal central differencing the sequence of ground truth positions to obtain the sequence of ground truth velocities.

3. The method of claim 2, wherein the acausal filter is a Savitzky-Golay symmetric acausal filter.

4. The method of claim 1, further comprising determining the sequence of ground truth velocities corresponding to the sequence of position measurement data based on a sequence of ground truth positions, wherein the sequence of ground truth positions are determined by:

solving an optimization problem to minimize a sum of a mean squared fitting error between the sequence of ground truth positions and the sequence of position measurement data, wherein the optimization problem is subject to box constraints determined by a quantization scheme of an encoder capturing the sequence of position measurement data and a term expressing a curvature of the sequence of ground truth positions;

wherein the sequence of ground truth velocities are obtained by acausal central differencing the sequence of ground truth positions.

5. The method of claim 1, wherein the ground truth velocities are measured via a tachometer.

6. The method of claim 1, wherein the processor is configured to adapt coefficients of a first causal FIR filter for a first task performed by the component of the electro-mechanical system by comparing estimated velocities and ground truth velocities corresponding to the first task, and adapt coefficients of a second causal FIR filter for a second task performed by the component of the electro-mechanical system by comparing estimated velocities and ground truth velocities corresponding to the second task, wherein the first task and the second task are different from each other when at least one of a motion trajectory of the component or a load moved by the component are different between the first task and the second task.

7. The method of claim 1, further comprising:

receiving, via the electro-mechanical system, a second task to be performed by the component;

collecting a second sequence of position measurement data and a second sequence of corresponding ground truth velocities corresponding to the second task; and updating the coefficients of the causal FIR filter to reduce a difference between the second sequence of corresponding ground truth velocities and the estimated velocities produced by filtering the second sequence of position data by the adapted causal FIR filter.

8. The method of claim 1, wherein the coefficients of the causal FIR filter are updated using one or a combination of a linear regression fitting, a neural network execution, a moving least squares estimation, a radial basis function smoothing, a locally weighted scatterplot smoothing (LOWESS), a smoothing spline learning, and a Tikhonov smoothing.

9. The method of claim 1, wherein the task corresponds to control of or estimation corresponding to the component of the electro-mechanical system.

10. The method of claim 1, wherein the electro-mechanical system includes multiple components including a first component and a second component, wherein the processor is configured to determine a first causal FIR filter for estimating velocities of the first component and a second causal FIR filter for estimating velocities of the second component, wherein coefficients of the first causal FIR filter differ from coefficients of the second causal FIR filter.

11. The method of claim 10, wherein the electro-mechanical system includes a robot, wherein the multiple components include multiple joints of the robot.

12. The method of claim 11, wherein one of the multiple components of the electro-mechanical system includes a motor moving a load, and wherein the task of the one of the multiple components includes one or a combination of a type of the load and a type of motion trajectory for moving the load.

13. An electro-mechanical system, comprising:

multiple joints including at least a first joint having a first mass and a second joint having a second mass;

multiple actuators configured to actuate the multiple joints including a first actuator configured to actuate the first joint and a second actuator configured to actuate the second joint;

multiple position sensors for measuring positions of the multiple joints including a first position sensor configured to measure positions of the first joint and a second position sensor configured to measure positions of the second joint;

multiple causal finite impulse response (FIR) filters configured to estimate velocities of the multiple joints including a first causal FIR filter configured to estimate velocities of the first joint by updating coefficients of the first causal FIR filter to reduce a difference between a sequence of ground truth velocities of the first joint and estimated velocities produced by filtering the measured positions of the first joint and a second causal FIR filter configured to estimate velocities of the second joint by updating coefficients of the second causal FIR filter to reduce a difference between a sequence of ground truth velocities of the second joint and estimated velocities produced by filtering measured positions of the second joint, wherein the coefficients of the first causal FIR filter differ from the coefficients of the second causal FIR filter, wherein first causal FIR filter and the second causal FIR filter correspond to a task performed by the first joint and the second joint; and a feedback controller configured to submit control commands to the multiple actuators, wherein the control commands are determined based on the measured positions and the estimated velocities of the multiple joints.

14. The electro-mechanical system of claim 13, further comprising a machine learning module configured to:

excite the electro-mechanical system to collect a sequence of measured positions of the first joint and a sequence of measured positions of the second joint;

submit the sequence of measured positions of the first joint and the sequence of measured positions of the second joint to an acausal filter configured to estimate velocities with apriori denoising to receive a corresponding sequence of ground truth velocities of the first joint and the sequence of ground truth velocities of the second joint;

determine the coefficients of the first causal FIR filter such that outputs of the first causal FIR filter approximate the sequence of ground truth velocities of the first joint; and determine the coefficients of the second causal FIR filter such that outputs of the second causal FIR filter approximate the sequence of ground truth velocities of the second joint.

15. The electro-mechanical system of claim 13, wherein the task corresponds to moving a load, wherein the electro-mechanical system further comprises:

a machine learning module configured to determine one or a combination of the coefficients of the first causal FIR filter and the coefficients of the second causal FIR filter in response to a change of the task and/or the load.

16. The electro-mechanical system of claim 13, wherein a first size of the first causal FIR filter differs from a second size of the second causal FIR filter.

17. The electro-mechanical system of claim 13, wherein at least one of the multiple position sensors is an encoder.

18. The electro-mechanical system of claim 13, wherein the task corresponds to control of or estimation corresponding to at least one of the multiple joints.

* * * * *